May 19, 1925.

H. DE F. MADDEN

COMPRESSION STOP

Filed June 2, 1921

1,538,441

INVENTOR
HARRY D. MADDEN
BY
ATTORNEY

Patented May 19, 1925.

1,538,441

UNITED STATES PATENT OFFICE.

HARRY DE FOREST MADDEN, OF NEWARK, NEW JERSEY, ASSIGNOR TO WESTING-HOUSE LAMP COMPANY, A CORPORATION OF PENNSYLVANIA.

COMPRESSION STOP.

Application filed June 2, 1921. Serial No. 474,391.

*To all whom it may concern:*

Be it known that I, HARRY DE FOREST MADDEN, a citizen of the United States, and a resident of Newark, in the county of Essex and State of New Jersey, have invented a new and useful Improvement in Compression Stops, of which the following is a specification.

This invention relates to devices adapted to interrupt the movement of given objects with cushioning effect and particularly to devices employed to stop the movement of conveyors or carriers used for transporting fragile articles.

Among the objects of the present invention is the provision of means operating to resiliently cause retardation, and a subsequent cessation of movement, of a conveyor, thus avoiding the usual jar and vibration caused by impact with a stop of the usual immobility.

Another object of the invention is to provide a stop which may be readily applied to a machine employing a carrier for transporting delicate or brittle articles.

A further object of the invention is to provide a stop comprising a simple and effective arrangement of parts which will function to perform their required operation without breaking or disturbing the transported articles.

Although applicable for other uses, an embodiment of my invention is shown and described in connection with a machine upon which a rotary spider constitutes an article conveyor and is adapted to permit operations to be performed upon the articles.

Conveyors of this type are well known in certain arts, as, for example, in the manufacture of parts for incandescent electric lamps; in which case, supporting heads carried by the conveyor position one or more glass parts in a given relation for treatment and for mechanical operations. The several glass parts of a lamp are usually assembled in a supporting head during a period when the conveyor is stationary, and the intermittent stoppage of the conveyor has heretofore been detrimental to efficient production for the reason that the impact between the stop and the conveyor resulted in excessive jarring or shaking which tended to rupture and to dislodge the delicate work parts.

Figure 1:
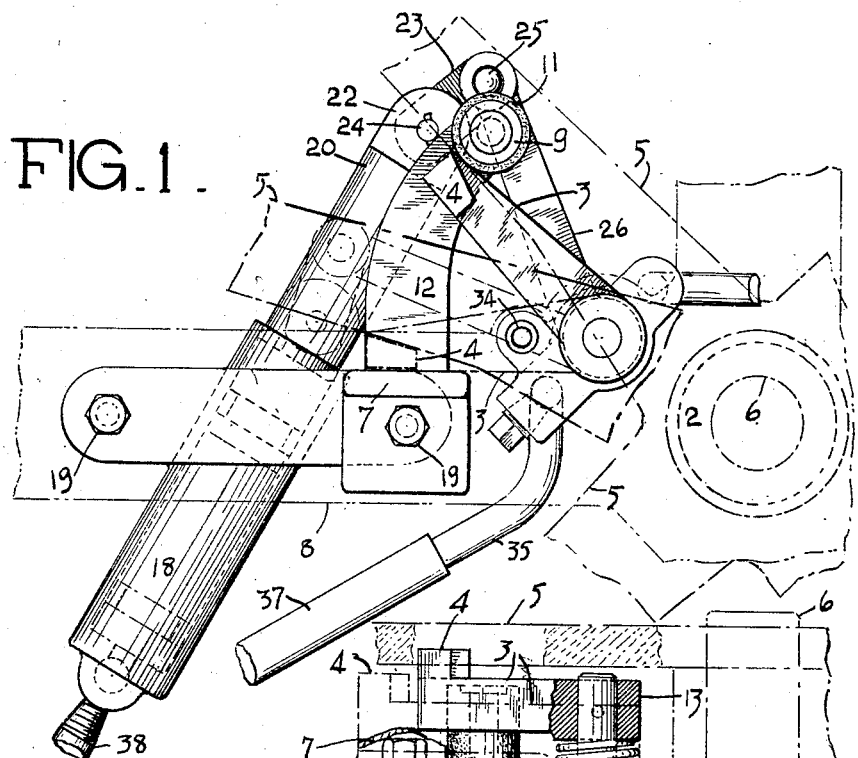

My invention will be best understood in connection with the accompanying drawings which are illustrative of one embodiment of my invention and in which, Fig. 1 is a plan view of my stop mechanism—parts being broken away—secured to the frame of a machine and in operative relation to a rotary spider or conveyor; the frame of the machine and the spider being shown in dotted lines to more clearly illustrate the operative parts of the stop mechanism.

Figure 2:
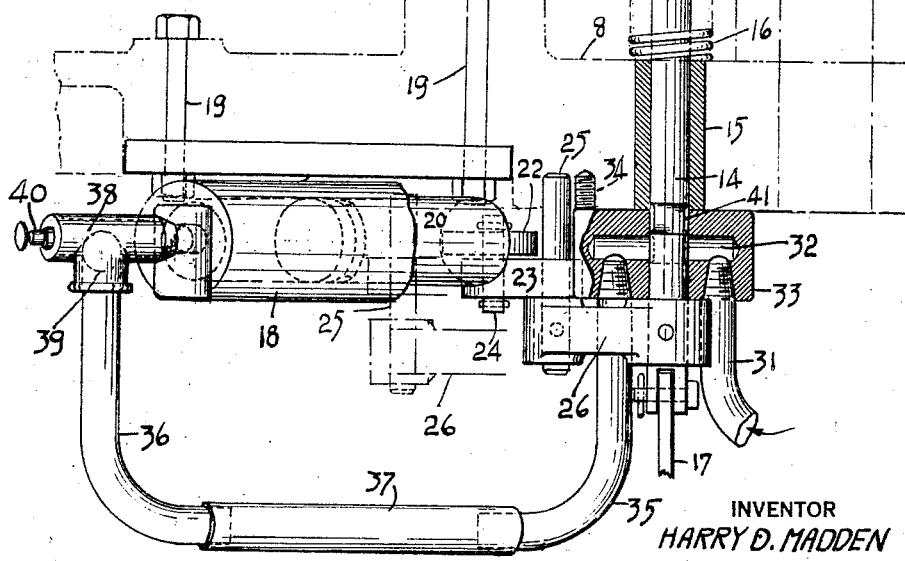

Fig. 2 is a side elevation of the mechanism, part of which is shown in section.

To accomplish the above recited and other objects, a cushioning means in provided which preferably includes a cylinder having a piston operating therein in opposition to a confined fluid. The piston is associated with a member adapted to be positioned in the path of, and to be moved by, a traveling object during a portion of its movement, thus causing a compression of the fluid in the cylinder. By this means, the velocity of the moving object is gradually diminished, and any vibration that may be caused by the impact between the stop member and the object is avoided or transmitted to, and absorbed by, the fluid within the cylinder.

It is thus obvious that, by the above means, the movement of an object may be resiliently or yieldably opposed and terminated. As the piston is moved inwardly, the fluid within the cylinder is compressed, and a suitable needle valve is provided to permit the restricted outlet of the fluid, thus relieving the compression as the object comes to rest. When an object has been stopped, its release for further movement is effected by means of a treadle which may be manually actuated, and, in addition, the operation of the treadle permits a fluid from a pressure line to be fed into the cylinder to drive the piston to its forward position and to move certain operative parts of the device to their normal positions. An actuation of the treadle performs the double function of operating a valve which controls the pressure line and simultaneously removes a stop member from the path of an object.

Referring to the drawing, my improved stop mechanism, as shown, is employed to stop and release an article conveyor 2. Preferably, the contacting part of the stop means consists of a stop arm 3 provided with a lug 4 positioned in the path of movement of arms 5 of the conveyor 2. The conveyor 2 is usually mounted to rotate on a central shaft 6 which, in turn, is connected, by a slip or friction drive, to any suitable source of power. Fig. 1 of the drawing shows, in dotted lines, the position of a conveyor arm before the conveyor has been stopped by the lug 4 and also the position of a conveyor arm when stopped by the lug.

The stop arm 3 is adapted to be oscillated between a projection 7 secured to frame 8 of the machine and a cylindrical stop member 9 which is provided with an elastic or resilient covering 11 of any suitable material. The member 9 is preferably carried on an extension 12 formed integral with the projection 7. The arm 3 is provided with a hub 13 which is secured to, and supported by, the upper end of a vertical shaft 14 which is adapted to reciprocate vertically in a sleeve 15 fastened in the frame 8 of the machine. The shaft is normally held in an upper position by means of a spring 16 disposed between hub 13 of the arm 3 and the upper end of the sleeve 15. When the shaft is in its normal upper position, the lug 4 on the arm 3 is maintained in the path of the conveyor arms 5.

When an arm of the conveyor has engaged the lug 4 and has rocked the stop arm 3 to repel the movement of the conveyor, means are provided to remove the arm from the path of the conveyor. Such means are preferably actuated by a treadle 17, one end of which is shown pivotally connected to the lower end of the shaft 14. When the treadle is depressed, the stop arm 3 and the lug 4 will be lowered and the conveyor permitted to rotate until a release of the treadle permits the spring 16 to effect an upward movement of the shaft 14 to move the arm 3 and the lug 4 so that the lug is positioned in the path of the succeeding arm of the conveyor.

The present invention contemplates a means for yieldably opposing the movement of the arm 3 to overcome the inertia of the conveyor and to bring the conveyor to rest quickly and without jar. A preferred means for resisting the movement imparted to the arm 3 is shown as comprising a cylinder 18 secured to the frame 8 by means of bolts 19 and having a piston 20 with the exposed end thereof provided with a lug 22 pivotally attached to one end of a link 23 by means of a pin 24. The free end of the link 23 is provided with an aperture to receive a vertical pin 25 carried by one end of a crank 26 which, in turn, is rigidly attached to, and oscillated by, shaft 14. A movement of the piston to bring the stop to its normal operating position therefore causes, by means of the connecting link 23, an oscillation of the shaft 14 and a consequent movement of the stop arm 3 to its outer position.

It will be understood that, since the pin 25 is adapted to be moved vertically in the aperture in the link 23, the treadle 17 may be operated to move the shaft 14 downwardly, and, upon such movement, the arm 3 and the lug 4 take the position shown in dotted lines in Fig. 2, while the crank 26 and the pin 25 take the positions shown in dotted lines in the same figure. By means of the adjustable or what may be termed a slidable connection between the said crank and link, a relatively movable coupling is provided and an operative connection between the piston and the shaft 14 is always maintained, irrespective of the position of the shaft.

Any suitable means may be employed to provide a resisting medium operating in opposition to the movement of the piston, and, when employing a fluid, it may be conducted by means of a pipe 31 from a constant-pressure line to one end of a manifold or cylindrical chamber 32 horizontally disposed within a casing 33 secured to the frame 8 by means of a tap bolt 34. Connection between the chamber 32 and the cylinder is provided by a duct consisting of a pipe 35, connected to the opposite end of the chamber 32, and connected to a pipe 36 by means of a flexible tube 37. The pipe 36 is screwed into a T 38 which, in turn, is connected to the head of the cylinder 18. A means is thus provided for the passage of a fluid from the pressure line to the cylinder. Any suitable form of check valve may be employed to prevent fluid from being forced back into the line when under compression within the cylinder through the action of the piston, one such checking means being indicated by the spherical member 39 which seats within the T to close the duct when the fluid in the cylinder is under pressure of the piston; the ball being automatically lifted when it is desired to admit fluid to the cylinder from the pressure line. The admission of fluid from the pressure line provides a positive means of moving the piston and, consequently, the other operative parts connected therewith to normal positions.

In the operation of the device, when one of the conveyor arms engages the lug 4, the arm 3 is moved toward the projection 7 and the movement of this arm is opposed by virtue of its connection to the compression member through the intermediate apparatus consisting of arm 3, crank 26, link 23 and piston 20; therefore, when the arm 3 is moved, the forces are transmitted to the compression member and are opposed by the force required to compress the fluid. A suitable valve 40 is provided to permit a restricted outlet to the atmosphere of the fluid as it is compressed by the piston, and the cylinder is thus relieved of compression to prevent any back throw of the conveyor when the arm 3 of the stop has been moved into contact with the projection 7.

The piston and operative parts associated therewith may be returned to their normal positions by means of the treadle 17 which actuates operative parts of the device to move the arm 3 transversely to its oscillatory path of movement. A movement of the treadle also reciprocates the shaft 14 which is constructed to perform the function of a slide valve and is positioned with its axial line intersecting, at right angles, the axial line of the cylindrical chamber 32. The shaft 14 is sufficiently larger in diameter than the cylindrical chamber and serves, when in its upper position, to separate the chamber 32 into two sections and cut off passage of fluid. In order to permit the flow of the fluid to the cylinder 18 when the shaft is in its lower position, an annular groove 41 is provided upon the shaft and so positioned that, when the treadle is depressed and the shaft is lowered, the groove 41 aligns with the chamber 32 and permits the passage of fluid from the pressure line to the cylinder 18 to return the piston to its normal position.

When the stop mechanism is used to provide means for intermittently stopping a conveyor and has operated to bring the conveyor to rest, the arm 3 and the lug 4 take the positions shown in dotted lines in Fig. 1. The operator then depresses the treadle, and the shaft 14 moves downwardly and carries the stop arm 3 and the lug 4 to the position shown in dotted lines in Fig. 2, the conveyor being then free to continue its movement. As the treadle is lowered, however, the fluid from the pressure line enters the cylinder and causes the piston to move outwardy to bring the stop arm 3 in contact with the cylindrical stop member 9. The treadle is then released and the shaft 14 moves upwardly under the action of the spring 16, the lug 4 being again positioned in the path of the conveyor arms to intercept the movement of the conveyor.

While I have illustrated a preferred embodiment of my device it is obvious that many structural changes may be effected therein and it is to be understood that such modifications are to be considered as being within the scope of the appended claims.

What is claimed is:

1. In a machine, the combination of a carrier for transporting fragile articles such as incandescent electric lamps or the like, a stop comprising a compression-member associated with said carrier, said member being movable transversely to and adapted to be positioned in the path of said carrier and means for removing said member from the path of said carrier.

2. In a machine, the combination of a carrier for transporting fragile articles such as incandescent electric lamps or the like, a stop comprising a compression-member and a movable-member slidably connected thereto, said movable-member being movable vertically and adapted to be positioned in the path of said carrier and means for removing said last mentioned member from the path of said carrier.

3. In a machine, the combination of a carrier for moving fragile article such as incandescent electric lamps or the like, a stop comprising a compression member, an oscillatory arm associated with said member, means for positioning said arm in the path of movement of said carrier and means for moving said arm vertically from said path.

4. A stop comprising a cylinder, a piston operating within said cylinder, an arm associated with said piston and adapted to be moved vertically to and from the path of a moving object and means for removing said arm from said path.

5. A stop comprising a compression element, an oscillatory arm slidably associated therewith, said arm being adapted to be positioned in the path of a moving object, and means for removing said arm from said path.

6. A stop comprising a cylinder, a piston within said cylinder, an arm slidably associated with said piston and adapted to be positioned in the path of a moving object and means for removing said arm from said path.

7. A stop comprising a cylinder, a piston within said cylinder, an oscillatory arm associated with said piston and adapted to be positioned in the path of a moving object and means for removing said arm from the plane of movement of said object.

8. A stop comprising a cylinder, a piston within said cylinder, an oscillatory arm slidably associated with said piston and adapted to be positioned in the path of a moving object and means for removing said arm from said path.

9. In a device having a resilient stop, the combination of a movable member slidably associated therewith, said member adapted to be positioned to receive the impact of a moving object and to transmit resisting forces to gradually arrest the movement of said object, and means for moving said member vertically to and from the path of said object.

10. A stop comprising a yieldable member, an oscillatory arm slidably associated with said member, said arm being adapted to be positioned in the path of a moving object and capable of movement with said object for a given distance and means for moving said arm from the path of said object.

11. A stop comprising a yieldable member, an oscillatory arm slidably connected thereto, means for moving said arm transversely to its oscillatory path of movement, a connection between said arm and said member and means for maintaining said connection operable during a diversity of positions of said arm and said member.

12. A stop comprising a cylinder containing a fluid, a piston capable of compressing said fluid, an arm connected to said piston and adapted to be positioned in the path of a moving object, whereby impact between said object and said arm causes a compression of said fluid and a gradual termination of the movement of said object and means for moving said arm downwardly and from the path of movement of said object.

13. A stop comprising a cylinder containing a fluid, a piston capable of compressing said fluid, an oscillatory arm connected to said piston and adapted to be positioned in the path of a moving object, whereby impact between said object and said arm causes a compression of said fluid and a gradual termination of the movement of said object and means for moving said arm vertically from the path of movement of said object.

14. A stop comprising a cylinder containing a fluid, a piston capable of compressing said fluid, an oscillatory arm slidably associated with said piston and adapted to be positioned in the path of a moving object, whereby impact between said object and said arm causes a compression of said fluid and a gradual termination of the movement of said object.

15. A stop comprising a cylinder, a piston within said cylinder, an oscillatory arm slidably associated with said piston and disposed in the path of a moving object, said arm being capable of moving with said object for a predetermined distance, and means for removing said arm from said path.

16. A stop comprising a cylinder containing a fluid, a piston capable of compressing said fluid, an oscillatory arm slidably associated with said piston and normally disposed in a given position in the path of a moving object, whereby engagement between said object and said arm causes a compresion of said fluid.

17. A stop comprising a cylinder having a fluid therein and a piston adapted to compress said fluid, an oscillatory arm slidably associated with said piston and positioned normally in a given position in the path of a moving object, said arm being adapted to engage said object and move therewith for a predetermined distance and means for removing said arm from said path.

18. A stop comprising a cylinder containing a fluid, a piston capable of compressing said fluid, an oscillatory arm slidably associated with said piston and normally disposed in a given position in the path of a moving object, whereby a movement of an object causes a movement of said arm and a compression of said fluid, and means for returning said arm to its initial position.

19. A stop comprising a cylinder containing a fluid and piston, an oscillatory arm adapted to be positioned in the path of a moving object and capable of movement with said object for a given distance, means for removing said arm from the path of said object and means for admitting a fluid to said cylinder, whereby said arm is returned to its initial position.

20. A stop comprising a cylinder, a piston within said cylinder, a pivoted arm, link connection between said arm and said piston, means for normally positioning said arm in the path of a moving object, said arm being capable of movement with said object for a given distance, means for removing said arm from said path and means for returning said arm to its normal position.

21. In a machine having a rotary conveyor, the combination of a compression member, an arm slidably associated with said member and adapted to be positioned in the path of said conveyor and means for removing said arm from the path of said conveyor.

22. In a machine, the combination of a rotary body for carrying fragile articles and a stop for gradually arresting the movement of said body, said stop comprising an arm capable of movement into and out of the path of said body, a compressible means operated by the movement of said arm, and a slidable connection between said arm and said compressible means.

23. In a machine comprising a conveyor adapted to carry work supports, the combination of a cylinder having a fluid and a piston therein, and an arm positioned normally in the path of the conveyor, said arm being associated with said piston whereby vibration due to the impact between the arm and conveyor may be absorbed by compressing said fluid and means for moving said arm vertically from the path of movement of said conveyor.

24. In a machine having a rotary conveyor, the combination of a cylinder having a fluid and a piston therein, and a pivoted arm positioned normally in the path of said conveyor, said arm being associated with said piston whereby the impact between the conveyor and said arm acts to move the piston and compress the fluid to gradually retard and terminate the movement of said conveyor and means for moving said arm in a direction substantially transverse to the path of movement of said conveyor.

25. A stop comprising a yieldable member, a vertical shaft disposed adjacent to said member, an arm secured to one end of said shaft, a crank on the opposite end of said shaft, a link connection between said crank and said member and a means for moving said arm in the path of a moving object to permit contact between said arm and object, thereby causing said member to yield and gradually terminate the movement of said object.

26. A stop comprising a yieldable member, a vertical shaft disposed adjacent to said member, a crank secured to one end of said shaft, a link connection between said crank and said member, an arm secured to the opposite end of said shaft, means for moving said arm in the path of a moving object whereby contact between the said arm and said object causes the arm to move with the object and said member to yield until sufficient resistance is offered to terminate the movement of the object.

27. A stop comprising a yieldable member having a cylinder and a piston, a vertical shaft disposed adjacent to said member, a crank secured to one end of said shaft, a link connection between said crank and said member, an arm secured to the opposite end of said shaft, means for moving said arm in the path of a moving object whereby contact between the said arm and said object causes the arm to move with the object and said member to yield until sufficient resistance is offered to terminate the movement of the object, and means for moving said arm from the path of the object and simultaneously cause fluid to enter the cylinder to force the piston to a normal position, thus actuating the connected mechanism to return the arm to a normal position.

28. A stop comprising a yieldable member having a cylinder and a piston, a vertical shaft disposed adjacent to said member, a crank secured to one end of said shaft, a link connection between said crank and said member, an arm secured to the opposite end of said shaft, means for moving said arm in the path of a moving object whereby contact between the said arm and said object causes the arm to move with the object and said member to yield until sufficient resistance is offered to terminate the movement of the object, means for moving said arm from the path of the object and to simultaneously cause fluid to enter the cylinder to drive the piston to a normal position, thus actuating the connected mechanism to return the arm to a normal position and means for removing said arm from the path of said object.

29. A stop comprising a yieldable element, an oscillatory member slidably connected thereto and adapted to be positioned in the path of a movable object, means for moving said member transversely to its oscillatory path of movement whereby said member is moved from the path of said object.

30. A stop comprising a yieldable element, an oscillatory member, a slidable connection between said element and said member, said member being adapted to be normally positioned in the path of a moving object, means for moving said member transversely to its oscillatory path of movement, whereby said member is moved from the path of said object, and means for returning said member to a normal position.

31. A stop comprising a yieldable member, a vertical shaft disposed adjacent to said member, an arm secured to one end of said shaft and normally disposed in the path of a moving object, a crank positioned on the opposite end of said shaft, means for moving said crank transversely to its oscillatory path, a slidable connection between said crank and said yieldable member whereby said connection may be maintained irrespective of the relative positions of said crank and said member and means for moving said arm from the path of said object.

In testimony whereof, I have hereunto subscribed my name this 1st day of June 1921.

HARRY DE FOREST MADDEN.